T. D. DAY.
Skirt-Protector.
No. 161,012.　　　　　　　　　　Patented March 23, 1875.
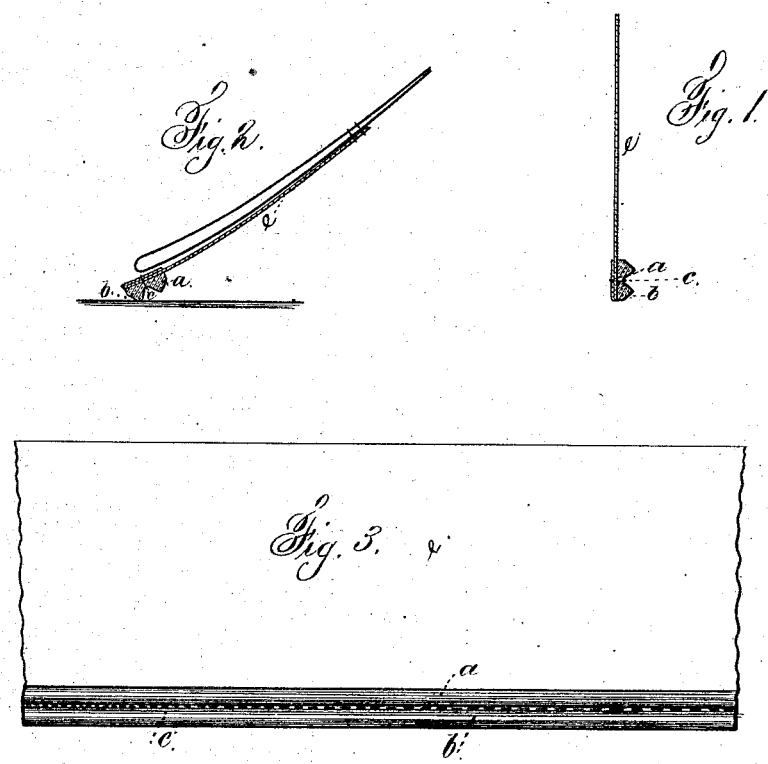
Witnesses
Harold Serrell
Geo. T. Pinckney
Inventor
Theodore D. Day
per Lemuel W. Serrell
　　　　　atty.

UNITED STATES PATENT OFFICE.

THEODORE D. DAY, OF ELIZABETH, NEW JERSEY, ASSIGNOR TO SALLIE V. DAY, OF SAME PLACE.

IMPROVEMENT IN SKIRT-PROTECTORS.

Specification forming part of Letters Patent No. 161,012, dated March 23, 1875; application filed February 4, 1875.

*To all whom it may concern:*

Be it known that I, THEODORE D. DAY, of Elizabeth, in the county of Union and State of New Jersey, have invented an Improvement in Skirt-Protectors, of which the following is a specification:

India-rubber has been employed as a skirt-protector, either in the form of a plain strip of rubber fabric or of a folded or plaited strip. The india-rubber surface is liable to wear off rapidly by abrasion against the floor or pavement.

The object of this invention is to provide a wearing-surface of india-rubber sufficiently thick to be durable, and at the same time to prevent the rubber being so rigid as to interfere with the graceful falling and trailing of the dress, and also to allow the rubber to be applied easily by sewing to the bottom of the dress as a protector or facing to the inside thereof.

I use a strip of india-rubber that is made with longitudinal ribs of sufficient size to withstand the wear to which it is subjected; and between these ribs there is a groove that makes the strip light and flexible, and the web of rubber between the ribs receives a line of stitching, by which the protector-strip is united to a strip of rubber cloth, muslin, or other suitable material that is to be attached to the inside of the dress at or near the lower edge.

In the drawing, Figure 1 is a cross-section of the strip of rubber, and a band of muslin or other material to which it is attached. Fig. 2 is a section of the same as attached to a dress-skirt, and Fig. 3 is an elevation of a piece of such skirt-protector.

The india-rubber strip is made with the two longitudinal ribs $a\ b$, with an intervening groove, $c$; and this strip is very light and pliable, because the two ribs become similar to india-rubber cords, and the rubber at the bottom of the groove becomes a web that connects them. The india-rubber strip is attached to the strip $e$, of enameled cloth, rubber cloth, muslin, or similar material, by a line of stitches applied in the web at the bottom of the groove $c$.

By this construction the line of stitching is protected from wear by the ribs $a\ b$ of rubber, so that there is no risk of the rubber strip becoming detached, and the rubber ribs will last much longer than the materials heretofore employed, and at the same time the skirt-protector can be wiped off easily to remove any mud or other foreign material.

The rubber strip may be continuous, or in suitable lengths or pieces, applied at the bottom of the dress, and is far superior to the braid or cord heretofore employed.

I do not claim a plain strip of india-rubber attached as a binding around the lower edge of a skirt lining or protector; neither do I claim a rib or cord inserted into the fabric of the lining, as these have been employed, and are different from and do not effect the object of my improvement.

I claim as my invention—

A skirt-protector formed of a strip of india-rubber, having a thin portion or web, through which the rubber is stitched to a strip of muslin or similar material, and a rib that projects from the surface of the rubber sufficiently to protect the line of stitches from wear, substantially as specified.

Signed by me this 3d day of January, 1875.

THEO. D. DAY.

Witnesses:
GEO. E. PINCKNEY,
GEO. D. WALKER.